Sept. 3, 1968    I. C. ANDERSON    3,399,939
FISHING TACKLE BOX
Filed April 5, 1967
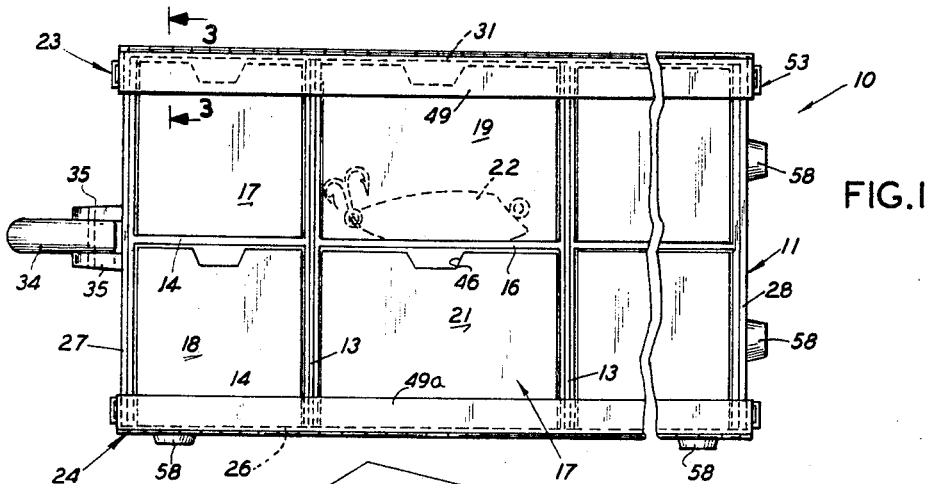
FIG.1
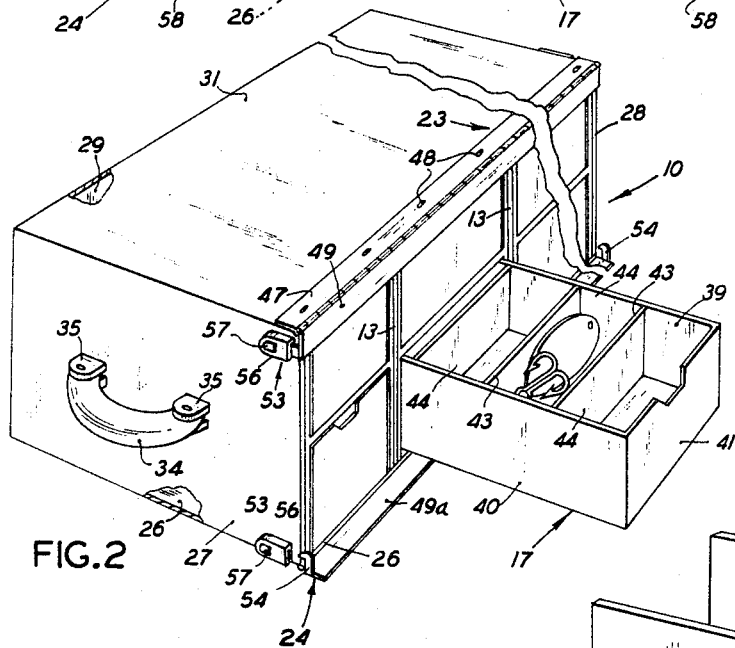
FIG.2
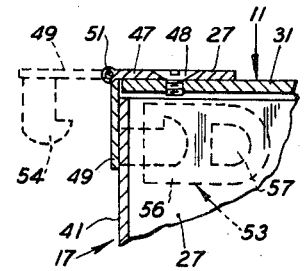
FIG.3
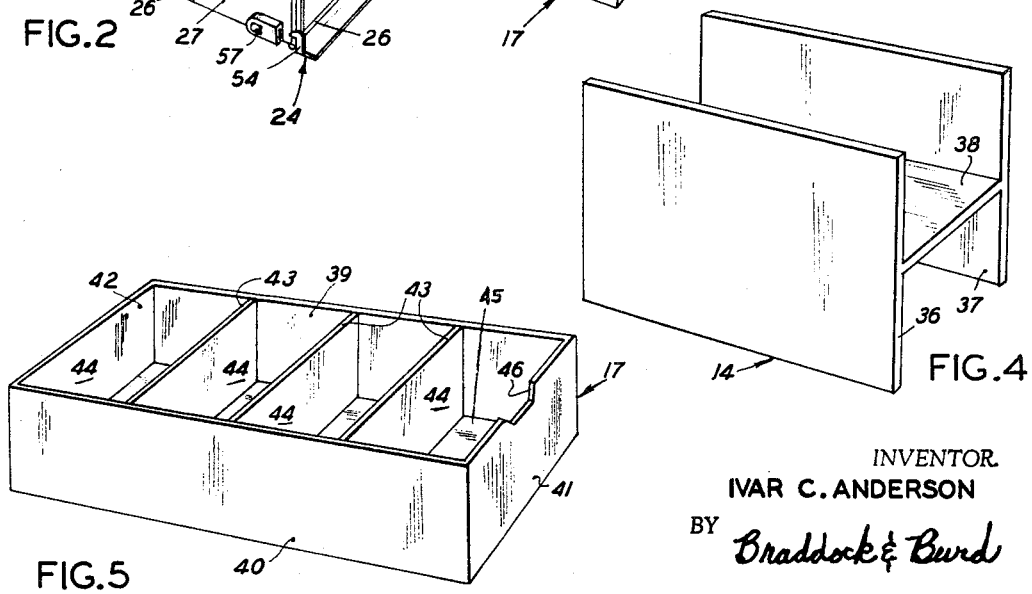
FIG.4
FIG.5
INVENTOR.
IVAR C. ANDERSON
BY Braddock & Burd
ATTORNEYS United States Patent Office 3,399,939
Patented Sept. 3, 1968

3,399,939
FISHING TACKLE BOX
Ivar C. Anderson, Rte. 2, Box 12A,
Cass Lake, Minn. 56633
Substituted for abandoned application Ser. No. 482,826,
Aug. 26, 1965. This application Apr. 5, 1967, Ser. No.
633,345
10 Claims. (Cl. 312—216)

ABSTRACT OF THE DISCLOSURE

A fishing tackle box having an open side and a handle at one end. A plurality of H-shaped dividers segregates the box into separate upper and lower channels open to the open side of the box. Box trays with separate storage compartments for fishing lures slide into the channel. The trays and dividers are retained in the box by hinged plates extended along the top and the bottom of the box. Releasable locks at the ends of the plates hold the plates adjacent the open end of the box.

*Cross-reference to related application*

This application is a substitute for my application Ser. No. 482,826, filed Aug. 26, 1965.

*Summary of invention*

The invention relates to a material or object storing container, and particularly to a fishing tackle box for storing fishing lures. The box has convenient and versatile storage capacity for trays equipped with storage compartments for the lures. Removable H-shaped dividers slide into the box through an open side and form upper and lower channels for the trays. The dividers and trays are held in the box with movable plate members. Lock means cooperate with the plate members to hold the plate members adjacent the ends of the dividers and trays.

The trays are of sizes and shapes comparable to the channels so that the fishing lures in the trays will remain in their compartments regardless of the position of the box. In use, individual trays can be removed from the box without disturbing the dividers or other trays. Also, one or more of the dividers can be removed to provide space for large trays.

In the drawings:

FIGURE 1 is a foreshortened side view of the tackle box of this invention;

FIGURE 2 is a foreshortened perspective view of the tackle box of FIGURE 1 with one of the trays in the open position;

FIGURE 3 is an enlarged sectional view taken along the line 3—3 of FIGURE 1;

FIGURE 4 is a perspective view of one of the H-shaped dividers separating the trays; and FIGURE 5 is a perspective view of one of the trays used to store fishing lures.

Referring to the drawing there is shown in FIGURE 1, the tackle box of this invention indicated generally at 10 for storing fishing lures as well as other fishing equipment. The tackle box 10 comprises a rectangular shaped housing or casing 11 having an open front side. The space enclosed by the housing is transversely divided by a plurality of upright partitions 13 forming with the housing 11 separate compartments having open front ends. The width and length of the housing 11 and the number of partitions 13 dividing the space within the housing into separate transverse compartments may be varied according to the size and the utility of the tackle box.

Located within each of the compartments are divider members 14 and 16 defining upper and lower chambers accommodating trays 17, 18, 19 and 21. As shown in FIGURE 1, the divider members 14 and 16 differ in width to accommodate different sized trays used to store fishing lures 22 as well as other fishing equipment.

The divider members 14 and 16 as well as the trays 17, 18, 19 and 21 are held in assembled relation in the housing 11 by releasable stop units 23 and 24. In use, the stop units 23 and 24 are normally locked in partially closed positions closing the open front side of the housing to prevent removal of the trays and divider members from the housing.

As shown in FIGURE 2, the housing 11, a rectangular-shaped box having an open front side, comprises a flat bottom wall 26 joined to upright flat end walls 27 and 28. The back of the housing is closed by an upright back wall 29 joined to a flat top wall 31 secured to the tops of the side walls. The partitions 13 are flat upright walls and are parallel to the end walls 27 and 28 and define therewith a series of side-by-side compartments for accommodating the divider members 14 and 16 and the lure storing trays 17, 18, 19 and 21. The number of compartments depends upon the length of the housing and location of the partitions.

To provide for convenient handling of the tackle box a U-shaped handle 34 is mounted on the mid-section of the end wall 27 by a plurality of outwardly projecting pairs of ears 35. Bumpers 58, secured to the bottom wall 26 and end wall 28 protect these walls from the surface supporting the housing.

Referring to FIGURE 4, there is shown divider member 14 which is substantially identical to the divider member 16. The divider member 14 has an H-shaped cross section and comprises spaced parallel upright members 36 and 37 connected at their adjacent mid-points with a flat bridging member 38. In use, a divider member of this shape may be inserted in one of the compartments from either end as well as in the inverted position and still divide the compartment into two separate or tray receiving chambers. The divider member 14 has a length which is substantially equal to the width of the housing 11 and a height substantially equal to the height of the housing. The specific dimensions of the divider members correspond to the sizes of the housing compartments.

Referring to FIGURE 5, there is shown tray 17 which is representative of the remaining trays used in the tackle box. The dimensions of the tray as well as the walls for segregating the tray into separate lure receiving areas may be varied according to the requirements of the lures and other fishing tackle. The tray 17 is a rectangular-shaped box having an open top and is formed by upright side walls 39 and 40 joined at opposite ends to a front wall 41 and rear wall 42. The bottom of the box is closed with a flat bottom wall 45. A plurality of upright spaced transverse walls 43 are joined to the side walls 39 and 40 and define therewith segregated areas 44 for individually housing fishing lures or other fishing tackle. To provide for removal of the tray from the compartments of the housing the front wall 41 has a finger receiving cut-out 46.

The releasable stop units 23 and 24 are identical in construction and function to retain the divider members 14 and 16 as well as the trays 17, 18, 19 and 21 in assembled relation in the housing 11. The following detailed description is limited to the stop unit 23. As shown in FIGURES 2 and 3, stop unit 23 comprises a continuous hinge which extends along the entire length of the box. The hinge has a stationary plate 47 secured to the top forward section of the housing top wall 31 by a plurality of screws 48 positioned in counter sunk holes in the plate 47. The forward end of the plate 47 is pivotally connected to a movable plate 49 by an elongated rod 51 projected through aligned holes in the adjacent ends of the plates 47 and 49. The movable plate 49 swings to open and closed positions as shown by broken and full lines.

A lock assembly 53 is used to hold the movable plate 49 in the closed or locked position. The lock assembly comprises a male hook 54 secured to the end of plate 49 and a female catch 56 mounted on the housing end wall 27. The catch includes a release tab 57 movable in a forward direction to release the hook 54. The movable plate member 49 may now be swung to the open position. To facilitate assembly of the trays and dividers into the compartment a biasing member, such as a spring may be attached to the movable plate to move and hold the plate 49 to the open position. Each end of the stop units 23 and 24 has a lock assembly 53 shown in FIGURE 3.

In use, it is contemplated that the fishing lures and other fishing tackle be stored in trays similar to tray 17. In preparation for a fishing trip it is necessary to collect specific fishing lures for the type of fishing activity. Trays with the desired lures are selected and inserted into the chambers established by the H-shaped dividers previously inserted into the compartments of the housing 11. When all of the trays have been assembled in the housing 11 the movable plates 49 and 49a of the stop units 23 and 24 are swung into the closed position and held in this position by the lock assemblies 53.

To remove a tray from the housing the lock assemblies 53 on opposite ends of one of the stop units 23 or 24 must be released by moving the release tabs 57. This permits the movable plate 49 to be swung to the open position. A finger is then used to slide the tray longitudinally out of the housing compartment. Since each of the lures are located in a segregated area they do not become intermingled and tangled with each other or with the other fishing tackle. As shown in FIGURE 1, the trays 17 to 21 each have a height which places the top edge of the tray closely adjacent the horizontal bridging member 38 of the divider member 14 in the top wall 31 of the housing and thereby preventing the lures from leaving their separate segregated areas. This prevents the lures and other fishing tackle from moving from the separate areas, when there is a change of position of the housing such as when the housing is set in an upright position on the end wall 28.

It is contemplated that the housing 11, the dividers 14 and 16, as well as the trays 17 to 21 may be made of rigid material such as wood, metal, plastic and the like. The size and shape of the housing can vary to change the capacity of the tackle box. The number of transverse housing compartments is discretionary depending upon the size and number of trays used in the tackle box. The size of the trays can vary according to the requirements of the fishing tackle. For example, the tray may be divided into segregated areas by upright longitudinal walls in combination with transverse walls.

While there have been shown, described and pointed out the basic novel features of the invention as applied to a preferred embodiment, it will be understood that various omissions, substitutions, changes in form and details of the tackle box illustrated may be made by those skilled in the art without departing from the spirit of the invention. It is intended that the invention be limited only as indicated by the scope of the following claims.

The embodiments of the invention in which an exclusive property or privilege is claimed are defined as follows:

1. A portable tackle box for storing fishing lures and the like comprising in combination: a housing having an open front side defined by a bottom wall, a top wall, end walls, and a back wall; a plurality of flat upright partitions projected laterally from said back wall toward the open front side dividing the area within the housing into separate compartments, each compartment having an open front side; a removable H-shaped divider member slidably positioned longitudinally in each compartment, each divider member having spaced upright side members extended from the bottom wall to the top wall and located close to adjacent upright partitions and a flat bridging member connecting the upright side members to define an upper channel space and a lower channel space; tray means slidably positioned in the channel spaces defined by the H-shaped divider members, each of said tray means having walls defining segregated areas for fishing lures; a pair of holding members movably secured to the top wall and to the bottom wall respectively, each holding member movable to a closed position adjacent the ends of the tray means and divider members thereby holding the tray means and divider members in assembled relation with the housing, said holding members movable to open positions enabling removal of the tray means and divider members from the housing; and releasable lock means for retaining the holding members in their closed positions.

2. The tackle box defined in claim 1 further characterized by: handle means secured to one of the walls of said housing.

3. The tackle box defined in claim 1 wherein said releasable lock means are mounted on the end walls adjacent the opposite ends of the holding members.

4. The tackle box defined in claim 1 wherein each holding member is an elongated flat plate and hinge means pivotally mounting one flat plate to the top wall and the other flat plate to the bottom wall.

5. The tackle box defined in claim 4 wherein said lock means hold each end of said plates to retain the plates in their closed positions.

6. A portable tackle box for storing fishing lures and the like comprising in combination: a housing having an open front side defined by a bottom wall, a top wall, end walls, and a back wall; a removable divider member slidably positioned in the area defined by the walls of said housing, said divider member including a flat bridging member secured to normally disposed spaced upright side members, separating the area into at least two chambers open to the front side of the housing, said upright side members extended from the bottom wall to the top wall; at least one tray means slidably positioned in one of said chambers defined by the divider member, said tray means having a size and shape similar to said one chamber; holding means movably secured to the housing, said holding means being movable to a closed position adjacent the end of the tray means and divider member at the open side of the housing thereby retaining the tray means and divider member in assembled relation with the housing and movable to an open position enabling removal of the tray means and the divider member from the housing, and releasable lock means for securing the holding means in the closed position.

7. The tackle box defined in claim 6 further characterized wherein the divider member has an H-shaped transverse cross sectional shape.

8. The tackle box defined in claim 6 including at least one upright partition projected laterally from said back wall toward the open front side dividing the area within the housing into separate compartments, each compartment having an open front side, said removable divider member located in one of said compartments.

9. The tackle box of claim 6 wherein said holding means comprise a first plate hinged to the top wall and a second plate hinged to the bottom wall, said first plate and second plate selectively movable to open and closed positions, said releasable lock means operable to secure the first plate and second plate in their closed positions.

10. The tackle box of claim 6 wherein the tray means is an open top box having intermediate walls defining segregated spaces for fishing lures.

References Cited
UNITED STATES PATENTS

| | | | |
|---|---|---|---|
| 1,833,081 | 11/1931 | Kilmer | 217—7 |
| 2,264,007 | 11/1944 | Stanton | 312—216 |
| 3,002,800 | 10/1961 | McMahan | 312—216 |
| 3,301,619 | 1/1967 | Mead | 312—200 |
| 3,306,689 | 2/1967 | Isaacson et al. | 312—199 |

CASMIR A. NUNBERG, *Primary Examiner.*